US012469409B1

(12) United States Patent
Brown et al.

(10) Patent No.: US 12,469,409 B1
(45) Date of Patent: Nov. 11, 2025

(54) PATIENT ELECTRONIC THERMODYNAMIC SIMULATOR

(71) Applicant: Magnelab, Inc., Longmont, CO (US)

(72) Inventors: Christopher Scott Brown, Longmont, CO (US); Samad Seyfi, Longmont, CO (US); Ali Seifi, San Antonio, TX (US); Ali Seyfi, Reston, VA (US)

(73) Assignee: Magnelab, Inc., Longmont, CO (US)

( * ) Notice: Subject to any disclaimer, the term of this patent is extended or adjusted under 35 U.S.C. 154(b) by 0 days.

(21) Appl. No.: 19/007,208

(22) Filed: Dec. 31, 2024

Related U.S. Application Data

(60) Provisional application No. 63/610,288, filed on Dec. 14, 2023.

(51) Int. Cl.
  *G09B 23/30* (2006.01)
  *G05D 23/19* (2006.01)
(52) U.S. Cl.
  CPC ......... *G09B 23/30* (2013.01); *G05D 23/1917* (2013.01)
(58) Field of Classification Search
  CPC ......... G09B 23/28; G09B 23/30; G09B 23/32
  See application file for complete search history.

(56) References Cited

U.S. PATENT DOCUMENTS

| 11,562,666 B2 | 1/2023 | Diller et al. |
| 2015/0250643 A1* | 9/2015 | Paradis ................. A61F 7/0085 |
| | | 607/104 |

FOREIGN PATENT DOCUMENTS

WO   WO-2012008930 A1 *   1/2012   ............. G09B 23/30

* cited by examiner

*Primary Examiner* — Robert J Utama
(74) *Attorney, Agent, or Firm* — NOD LAW PC (57) ABSTRACT

The present disclosure generally relates to a thermodynamic simulator system for simulating a thermodynamic response (TDR) of a patient's skin without the need for inserting probes and sensors into the patient. The system includes a simulated skin layer (SSL) having a mass of material thermally connected to multiple heating elements; at least one temperature sensor (TS) disposed in the SSL; one or more temperature management (TTM) pads applied to the SSL and coupled to a TTM device, the TTM pads configured to modify heat transfer from the SSL; and a control unit configured to obtain temperature data (TD) from the TS; regulate power to the heating elements based on the temperature data; simulate an internal/core temperature for the patient using an internal body thermodynamic simulation, the TD, and the supplied power. The system includes a core TS for transmitting the internal temperature to the TTM device.

20 Claims, 9 Drawing Sheets

PATIENT ELECTRONIC THERMODYNAMIC SIMULATOR

CROSS-REFERENCE TO RELATED APPLICATIONS

This application for patent, assigned U.S. patent application Ser. No. 19/007,208, filed on Dec. 31, 2024, entitled "PATIENT ELECTRONIC THERMODYNAMIC SIMULATOR," claims the benefit under 35 U.S.C. § 119(e) of U.S. Provisional Application No. 63/610,288, entitled "PATIENT ELECTRONIC THERMODYNAMIC SIMULATOR," and filed on Dec. 14, 2023.

FIELD OF THE DISCLOSURE

The present disclosure relates generally to patient thermodynamic simulators. More specifically, but without limitation, the present disclosure relates to systems, methods, apparatuses, and storage media for a Patient Electronic Thermodynamic Simulator (PETS).

DESCRIPTION OF RELATED ART

Targeted temperature management (TTM) involves cooling a patient until their core temperature drops to well below normal body core temperature, for instance, to prevent or reduce swelling of the brain when the patient is in a medically induced coma, during surgery, etc. Currently, to educate the healthcare operators about how to cool the patients using the TTM equipment, the TTM equipment is connected to a human being or a patient to show how the TTM equipment works. Existing technologies often use water, mechanical pumps, and/or chambers to simulate the thermodynamic behavior of the patient's body. However, such techniques are often convoluted, suffer from long simulation set-up times, and are energy intensive.

There is therefore a need for a refined thermodynamic simulator that can be utilized to train healthcare professionals in how to use TTM equipment. Additionally, or alternatively, there is a need for a device that can be utilized to evaluate TTM equipment (e.g., confirm whether it is functioning properly) over long periods of time. Furthermore, there is a need for a device that can help train personnel with a patient analog that can respond to the action of the TTM equipment in realistic ways over complete therapy sessions. Lastly, there is a need for a version of a patient thermodynamic simulator that does not require water and/or mechanical pumps to achieve the simulation, which can help in faster simulation set-up times, require less energy to operate, improve safety, and/or allow for more flexibility with regards to simulation parameters.

The description provided in the Description of Related Art section should not be assumed to be prior art merely because it is included in or associated with this section. This section may include one or more aspects of the subject technology described in this disclosure.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Broadly, aspects of the present disclosure relate to a Patient Electronic Thermodynamic Simulator (PETS) that is configured to allow users of Targeted Temperature Management (TTM) equipment (e.g., TTM equipment 850 in FIG. 8) to test the functionality of the TTM equipment without the need for an actual patient. This may be achieved by simulating the skin layer with a mass of material (e.g., simulated skin layer 1) that is thermally connected to heating elements (e.g., heaters 2), which can help simulate the typical skin temperature and/or thermodynamics of the patient. A control unit comprising a computer and/or a microcontroller (e.g., control unit 7) can help maintain this skin temperature by regulating the heat output through the heaters 2 into the simulated skin layer 1. In some cases, the remainder of the thermodynamic systems of the body (e.g., internal or core body temperature) may be simulated within the control unit 7, for instance, using an internal body thermodynamic simulation 8.

In some embodiments, the power to the heaters 2 may be adjusted based on the simulation 8 so that the simulated skin layer 1 can precisely react to the action of the TTM and in a manner similar to which the skin layer of an actual patient would. When heat is transferred out of or into the simulated skin layer 1 by the TTM pads (e.g., TTM pads 6 in FIG. 3), the control unit 7 (or simulation 8) responds to keep the skin layer 1 at a temperature that makes it seem that it is the outer layer of a metabolizing body. In some examples, this may be achieved by monitoring the temperature of the simulated skin layer 1 with a temperature sensor (e.g., temp sensor 4), calculating the new target skin layer temperature, and adjusting the heaters 2 to reach this new target skin layer temperature. Thus, some aspects of the present disclosure relate to a control feedback loop, where the control feedback loop may be implemented using heaters 2, temp sensor(s) 4, and the control unit 7 in FIG. 7. In some cases, this control feedback loop may be periodically updated (e.g., every 10 seconds, every 5 seconds, every 20 seconds, to name a few).

In addition to the skin layer, where the temperature of the layer needs to be accurate to simulate or recreate a patient, the TTM may need to be able to monitor the simulated patient's core temperature (e.g., internal body temperature of the simulated patient). In some embodiments, the core temperature of the simulated patient may be calculated/simulated using the internal body thermodynamic simulation 8 running on the control unit 7 and can be simulated in various ways. In some embodiments, the core temperature may be simulated using a variable resistor 99 (or programmable resistor 99) in the simulated core temperature sensor 10, which can help simulate the thermistor used by most TTM units to determine the patient core temperature.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

The present disclosure relates generally to patient thermodynamic simulators. More specifically, but without limitation, the present disclosure relates to systems, methods, apparatuses, and storage media for a Patient Electronic Thermodynamic Simulator (PETS).

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

For the purposes of this disclosure, the terms patient thermodynamic simulator, Patient Electronic Thermodynamic Simulator (PETS), Patient's Electronic Thermodynamic Simulator (PETS), or Digital Human Thermoregulator Simulator (DHTS) may be used interchangeably throughout the disclosure.

Broadly, aspects of the present disclosure relate to a PETS that is configured to allow users of TTM equipment (e.g., TTM equipment 850 in FIG. 8) to test the functionality of the TTM equipment without the need for an actual patient. This may be achieved by simulating the skin layer with a mass of material (e.g., simulated skin layer 1) that is thermally connected to heating elements (e.g., heaters 2), which can help simulate the typical skin temperature and/or thermodynamics of the patient. A control unit comprising a computer and/or a microcontroller (e.g., control unit 7) can help maintain this skin temperature by regulating the heat output through the heaters 2 into the simulated skin layer 1. In some cases, the remainder of the thermodynamic systems of the body (e.g., internal or core body temperature) may be simulated within the control unit 7, for instance, using an internal body thermodynamic simulation 8. In some cases, the PETS may include one or more control feedback loops (e.g., a first feedback loop comprising heaters 2, temperature sensors 4, and the control unit 7; a second feedback loop comprising the simulation 8, control unit 7, core temperature sensor 10, and heaters 2), that can help simulate the skin layer, as well as core body temperature, of a simulated patient, in accordance with various aspects of the present disclosure.

In some embodiments, the power to the heaters 2 may be adjusted based on the simulation 8 so that the simulated skin layer 1 can precisely react to the action of the TTM and in a manner similar to which the skin layer of an actual patient would. When heat is transferred out of or into the simulated skin layer 1 by the TTM pads (e.g., TTM pads 6 in FIG. 3), the control unit 7 (or simulation 8) responds to keep the skin layer 1 at a temperature that makes it seem that it is the outer layer of a metabolizing body. In some examples, this may be achieved by monitoring the temperature of the simulated skin layer 1 with a temperature sensor (e.g., temp sensor 4), calculating the new target skin layer temperature, and adjusting the heaters 2 to reach this new target skin layer temperature. Thus, some aspects of the present disclosure relate to a control feedback loop, where the control feedback loop may be implemented using heaters 2, temp sensor(s) 4, and the control unit 7 in FIG. 7. In some cases, this control feedback loop may be periodically updated (e.g., every 10 seconds, every 5 seconds, every 20 seconds, to name a few).

In addition to the skin layer, where the temperature of the layer needs to be accurate to simulate or recreate a patient, the TTM may need to be able to monitor the simulated patient's core temperature (e.g., internal body temperature of the simulated patient). In some embodiments, the core temperature of the simulated patient may be calculated/simulated using the internal body thermodynamic simulation 8 running on the control unit 7 and can be simulated in various ways. In some embodiments, the core temperature may be simulated using a variable resistor 99 (or programmable resistor 99) in the simulated core temperature sensor 10, which can help simulate the thermistor used by most TTM units to determine the patient core temperature. In some cases, the control feedback loop implemented using simulation 8, control unit 7, core temperature sensor 10, and heaters 2 may be used to enable the PETS to set a core temperature for the simulated patient and enable the TTM to react in a manner similar to when a thermistor probe is inserted into an actual patient, further described below in relation to FIG. 3.

Figure 1:
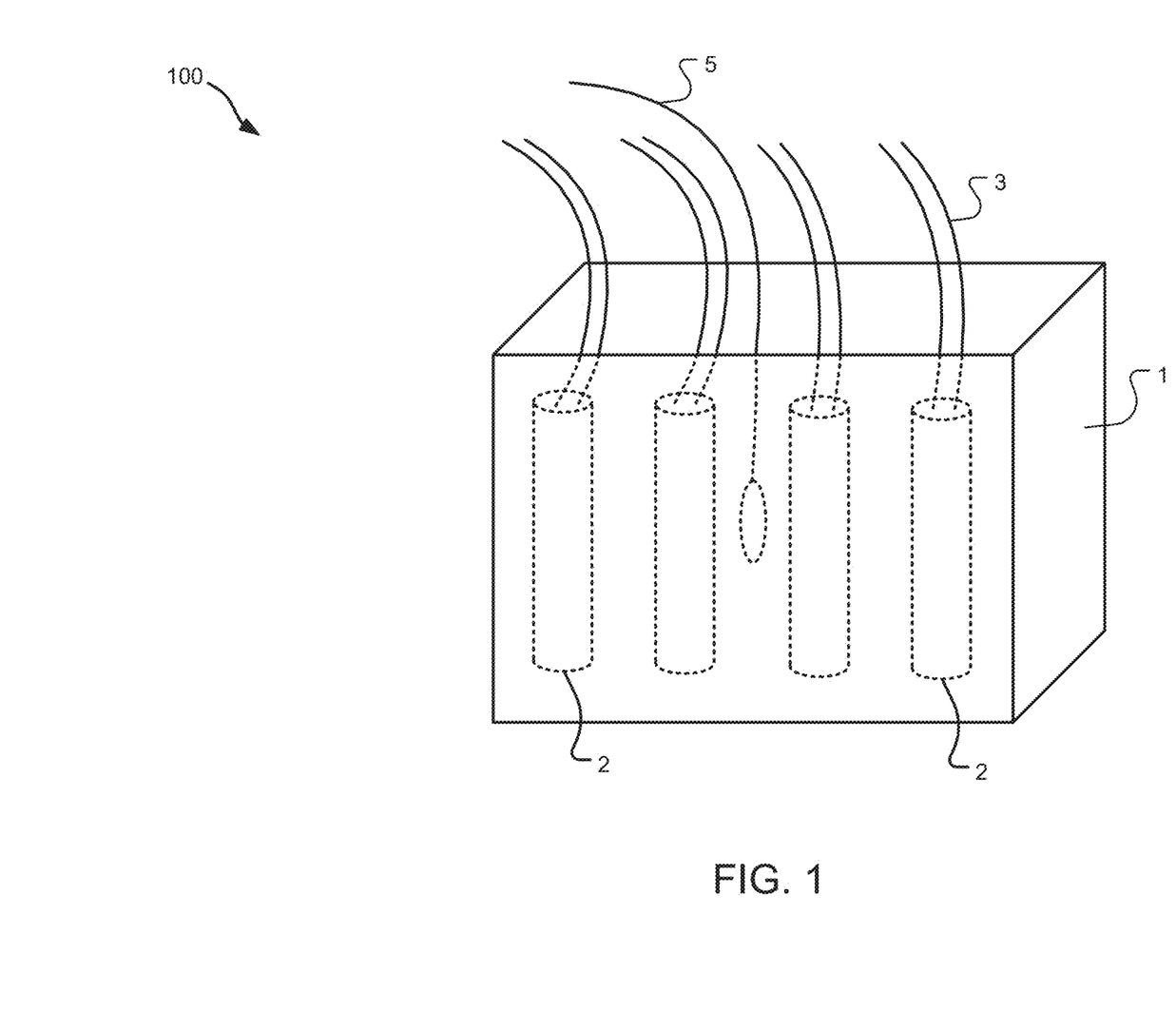
FIG. 1 is a side view of a simulated skin layer showing heating elements and temperature sensors disposed inside the simulated skin layer, according to various aspects of the present disclosure.

Additional details on the PETS and its various components are described with reference to FIGS. 1-8. Turning now to FIG. 1, which illustrates a side view of a simulated skin layer 1 showing heating elements 2 and at least one temperature sensor 4 disposed inside the simulated skin layer, according to various aspects of the present disclosure.

In some embodiments, the simulated skin layer 1 may comprise a mass of material, where the mass of material may comprise one or more of a metal, plastic, gel, epoxy, polyurethane, or another applicable solid or semi-solid material, or a combination of similar materials. The one or more solid or semi-solid materials used for the simulated skin layer 1 may be selected, for instance, based on their ability to provide an accurate representation of the skin layer or outer layer of a patient. FIG. 1 also shows a plurality of distributed heating elements 2 that are installed inside the simulated skin layer 1 and utilized to warm the simulated skin layer. In some examples, the heating elements 2 may comprise resistive heaters, Peltier devices, or other applicable devices that can be used to warm or cool the simulated skin layer 1. In some embodiments, each of the plurality of heating elements 2 may be connected to a power lead 3. Furthermore, each of the power leads 3 may be connected to a relay (e.g., shown as heater relay in FIG. 9), where the relays may be coupled or connected to a microcontroller or computer (e.g., microcontroller or computer 7 shown in FIG. 3). In some embodiments, the microcontroller or computer may be configured to control the one or more relays to adjust or control the temperature of the respective heating element. In this way, the microcontroller or computer can be utilized to adjust the temperature of the simulated skin layer 1.

In some cases, a temperature sensor 4, such as, but not limited to, a thermistor, thermocouple, or another applicable temperature sensor may be used to sense the temperature of the simulated skin layer 1. While FIG. 1 depicts a single temperature sensor 4, this is not intended to be limiting. For instance, in some embodiments, more than one temperature sensor can be included in the same simulated skin layer 1. As shown in FIG. 1, the temperature sensor 1 may be connected to the control unit (e.g., microcontroller or computer 7) by a sensor wire 5.

It should be noted that the number of heating elements, power leads, temperature sensors, and/or sensor wires depicted in FIG. 1 is not intended to be limiting, and different numbers of these components can be included in different embodiments without departing from the scope and/or spirit of the disclosure.

Figure 2:
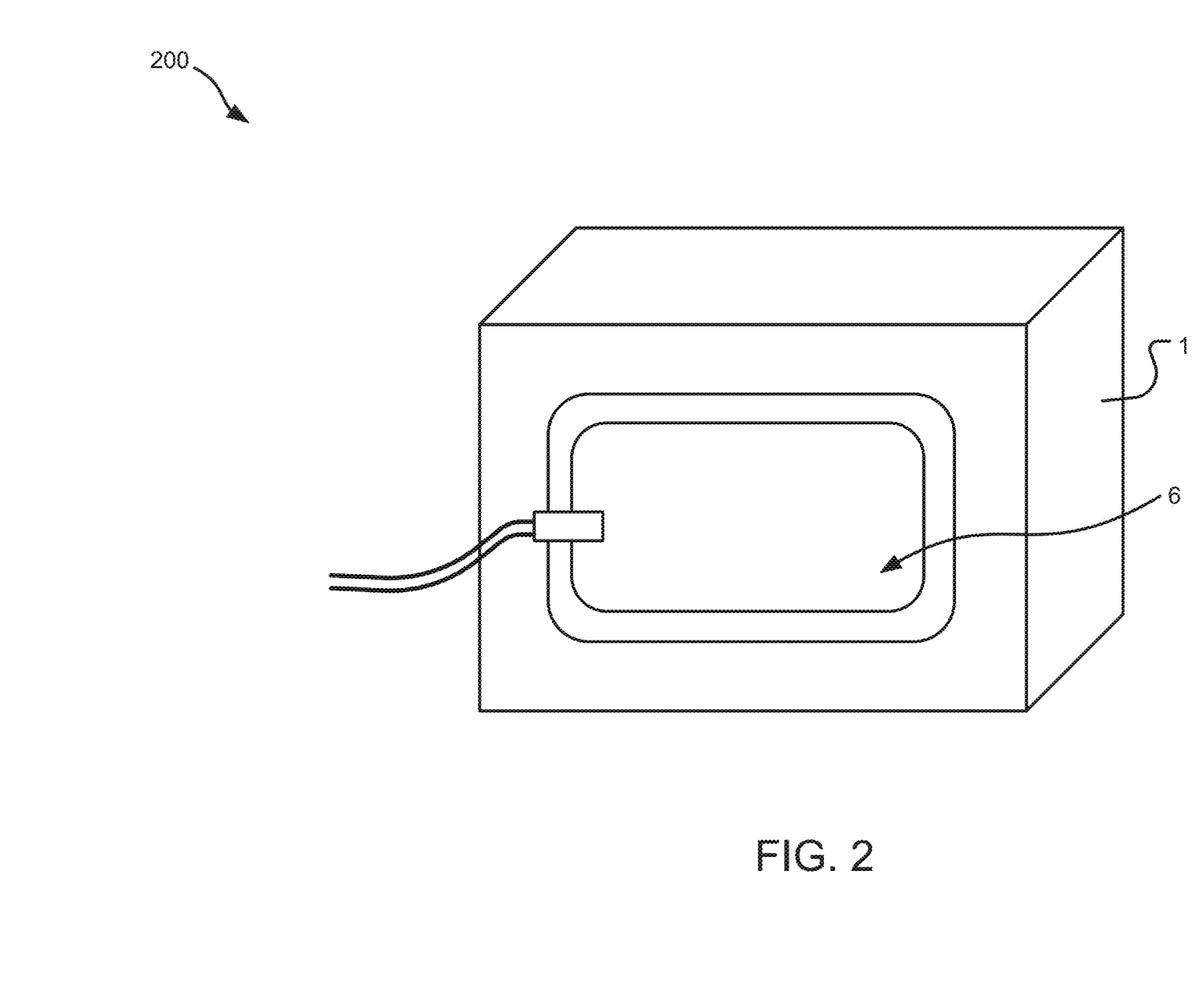
FIG. 2 is a side view of the simulated skin layer in FIG. 1 showing the placement of the one or more pads from a Targeted Temperature Management (TTM) system, according to various aspects of the present disclosure.

FIG. 2 illustrates a side view 200 of the simulated skin layer 1 in FIG. 1 showing the placement of one or more pads from a Targeted Temperature Management (TTM) system, according to various aspects of the present disclosure.

In some embodiments, the simulated skin layer 1 may have one or more exposed areas on one or more sides to accommodate the application (e.g., placement) of one or more temperature therapy pads 6. In some examples, the temperature therapy pads 6 (or simply, pads 6) may be coupled to a TTM system, described in further detail below. In some cases, the temperature therapy pads 6 may also be referred to as TTM pads 6.

Figure 3:
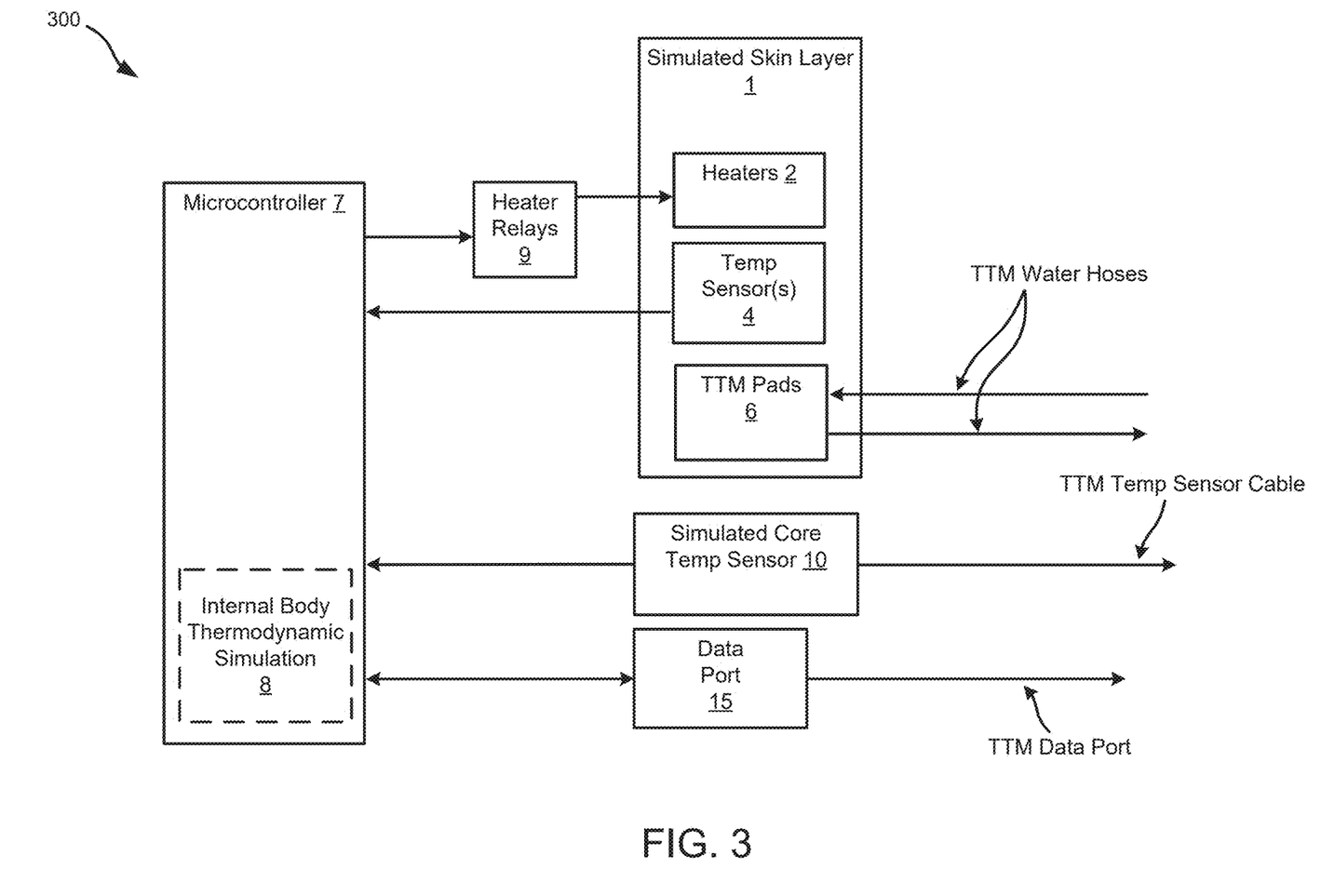
FIG. 3 is a schematic diagram of a control unit including various connections to different components of a TTM system, according to various aspects of the present disclosure.

FIG. 3 illustrates a schematic diagram of a Patient Electronic Thermodynamic Simulator (PETS) system 300, according to various aspects of the disclosure. As seen, the PETS system 300 comprises a control unit (e.g., microcontroller/computer 7), at least one heater relay 9, a simulated skin layer 1, a simulated core temperature sensor 10, and at least one data port 15. The simulated skin layer 1 may be similar or substantially similar to the skin layer 1 described in relation to FIG. 1 and may include a plurality of heaters 2 and temperature sensors 4 disposed in the skin layer 1. Furthermore, one or more TTM pads 6 (e.g., shown as temperature therapy pads 6 in FIG. 2) may be placed or applied on at least one exposed area of the skin layer 1. In some embodiments, one or more water hoses (or hoses configured to carry another applicable fluid or liquid) may be coupled at one end to the TTM pads 6, as shown in FIG. 3. In some cases, the other end of the TTM water hoses may be coupled to a TTM system. In some aspects, the TTM water hoses provide a loop for carrying warm water (or alternatively, cool or cold water) from the TTM system to the TTM pads and back to the TTM system. In one non-limiting example, the TTM water hoses may carry a continuous flow of cool/cold water, which can help reduce the temperature of the simulated skin layer 1.

In some cases, the control unit or microcontroller 7 of the PETS system 300 is used to execute or run an internal body thermodynamic simulation 8 (also referred to as simulation 8). The simulation 8 running on the microcontroller 7 can be used to simulate the thermodynamics of the internal body of the simulated patient. In some instances, simulating the internal body of the patient may include simulating the internal heat energy and/or the heat energy flow between the simulated skin layer 1 and the interior of the simulated patient's body. In some cases, the internal body thermodynamic simulation 8 can be used to simulate how the temperature of one or more organs (e.g., heart, liver, brain, kidneys, etc.) may vary in response to the temperature of the skin layer.

FIG. 3 also depicts one or more heater relays 9 coupled between the heaters 2 in the simulated skin layer 1 and the control unit 7. In some embodiments, the heater relays 9 may be used to deliver alternating current (AC) or direct current (DC) power to the heaters 2 and may be controlled using the control unit 7.

The PETS system 300 may also include a simulated core temperature sensor 10 for interface with the TTM equipment, where the simulated core temperature sensor 10 may be used to help create a simulated patient core temperature. In some embodiments, the simulated core temperature sensor 10 may comprise a simulated thermistor, a digital potentiometer, a programmable resistor, and/or another applicable variable resistor or resistor network, to name a few non-limiting examples. In some cases, the simulated core temperature sensor 10 may help the PETS system 300 and/or the control unit 7 communicate, e.g., through its temperature sensor mechanism, a simulated core temperature to the TTM system.

In some cases, the PETS system 300 may employ one or more control feedback loops, in accordance with various aspects of the disclosure. For example, a first control feedback loop may be implemented using heaters 2, temp sensor(s) 4, and the control unit 7, where the first control feedback may be utilized to maintain the temperature (e.g., core body temperature, temperature of skin layer, or both) of the patient. In some cases, the PETS system 300 may include a second control feedback loop, where the second control feedback loop may be implemented using heaters 2, the control unit 7, and the simulated core temperature sensor 10.

In some embodiments, the simulated patient's core temperature may be calculated by the simulation 8 running on the control unit 7. For example, the simulation 8 may periodically monitor (e.g., every 10 seconds) the temperature of the simulated skin layer 1 and the amount of energy that is being output through the heating elements 2. From those two values and the known value of the specific heat of the simulated skin layer 1, the simulation 8 may be used to determine how much the internal body heat energy should change inside the simulated patient's body. Specifically, once the simulation 8 determines the new internal body heat energy level from those two inputs (i.e., temperature of simulated skin layer and energy output from the heaters) and the specific heat of the simulated skin layer, it uses the programmed mass of the internal body and the programmed specific heat of the internal body to calculate the new internal temperature of the body.

In some examples, the internal body thermodynamic simulation 8 may be based on established thermodynamic physics formulas. In other cases, however, the internal body thermodynamic simulation may also include the effects of circulation on the heat flow from the internal body to the skin layer, which can help enhance the accuracy of the simulation. Furthermore, the simulation 8 may also incorporate simulations or models of the various layers of tissues in the body as they apply to heat transfer from the core out through the body and skin layer.

In some embodiments, the simulated core temperature sensor 10 may comprise a simulated thermistor and/or a variable resistor. Thermistors are typically used in TTM units to monitor patient core temperatures. For example, the thermistor (i.e., a temperature sensitive resistor) may be positioned on the end of a probe that is inserted into the patient's body through the mouth down to the esophagus. Further, the resistance value of the thermistor may be read by the TTM unit using a two (2) conductor connection and converted into a temperature reading.

In accordance with aspects of the disclosure, a variable resistor with a digital control (e.g., a digipot with an I²C communication connection) may be employed in the simulated core temperature sensor 10. In some cases, this variable resistor can be employed to simulate different types of thermistors or temperature probes typically used in TTM systems. For example, the control unit 7 may utilize a reference table for a standard thermistor probe, such as a YSI Series 400 temperature probe, where the reference table includes a mapping of the resistance values of the thermistor to different temperatures. As an example, if the resistance value of the thermistor is 3000 Ohms at 37 degrees C., the resistance value of the variable resistor can be set to 3000 ohms in order to simulate or represent the patient temperature as 37 degrees C. In some cases, the TTM equipment/device can be directly coupled to the variable resistor (e.g., variable resistor 99) in the simulated core temperature sensor 10. In such cases, the TTM equipment/device may sense a patient with 37 degrees C. core temperature based on reading the resistance of the variable resistor as 3000 ohms. In this way, the simulated core temperature sensor 10 can be used to help simulate different core temperatures to the TTM device without having to insert a thermistor probe into an actual patient.

In some cases, the control unit 7 may vary the value of the variable resistor 99 based on the calculated simulated patient's core temperature, where the core temperature may be determined by the internal body thermodynamic simulation 8. In some instances, if the core temperature calculated by the simulation 8 changes, the control unit 7 may determine a new resistance value for the variable resistor and update the resistance value of the variable resistor to the new resistance value.

In some cases, the TTM device or equipment may adjust the temperature of the water (or fluid) flowing through the TTM pads based on the value of the patient core temperature. When used with real patients, TTM devices typically sense the resistance of the thermistor probe and calculate the patient core temperature from a lookup table of resistances and temperatures (or mapping) for that specific thermistor probe. The TTM devices can then adjust the temperature of the water flowing to the pads based on if the therapy is set to warm or cool the patient. Similar principles can apply when the TTM device is coupled to the PETS system 300. For example, if the TTM device detects a change in the resistance value of the variable resistor (or simulated thermistor), the TTM device may calculate the simulated patient's core temperature from a lookup table of resistances and temperatures (i.e., mapping) and adjust the temperature of the water flowing to the pads based on the specific requirements (e.g., cooling, heating) of the therapy.

Figure 4:
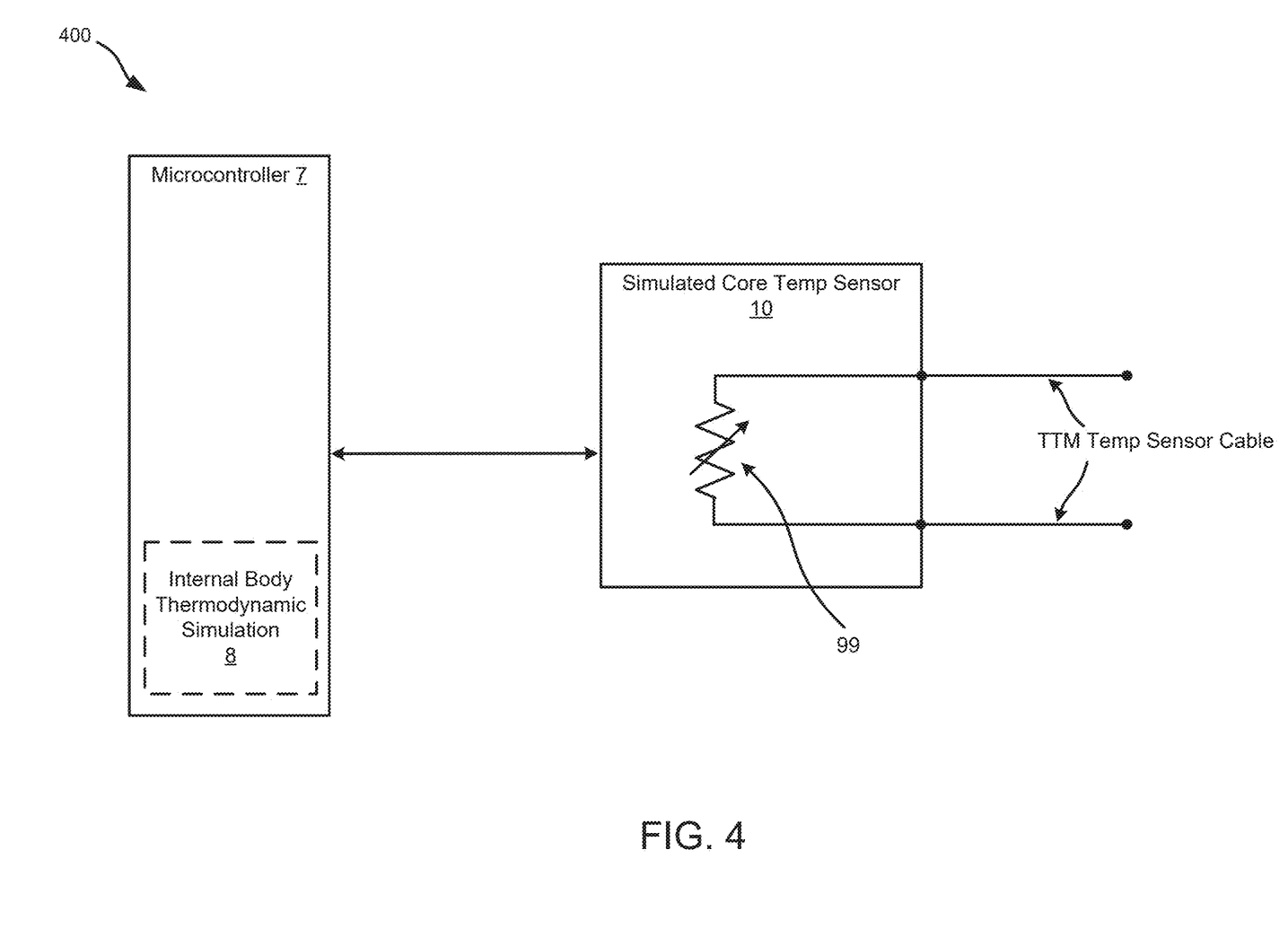
FIG. 4 is a schematic diagram of a simulated thermistor connected to a microcontroller or computing system, according to various aspects of the present disclosure.

FIG. 4 illustrates a schematic diagram 400 showing the microcontroller 7 (or control unit 7) coupled to the simulated core temperature sensor 10, in accordance with various aspects of the disclosure. As noted above, the core temperature sensor 10 may comprise a simulated thermistor, a digital potentiometer, a programmable resistor, and/or another applicable variable resistor or resistor network. In this example, the core temperature sensor 10 comprises a variable resistor 99 (or programmable resistor 99). In some embodiments, the microcontroller 7 may program the resistance of the variable resistor 99, where the programming may be based on one or more of the control signals sent to the heaters 2 via the heater relays 9, measurements taken from the temp sensor(s) 4, and simulation results/estimates from the internal body thermodynamic simulation 8. Furthermore, the TTM system may be coupled to the simulated core temperature sensor 10 using a TTM temperature sensor connection, as shown in FIG. 4. In some examples, the TTM system may determine the simulated core temperature based on determining the resistance value of the variable resistor. In one non-limiting example, the TTM may pass a current (I) of a known value through the variable resistor 99 and measure a corresponding voltage (V) across the variable resistor. The TTM can then determine the simulated core temperature by determining the resistance (R) of the variable resistor 99, e.g., R=V/I. In another example, the TTM may apply a known voltage across the variable resistor 99 and measure the current flow to determine the resistance of the variable resistor 99. Other techniques known in the art for measuring the resistance value of a variable/programmable resistor are contemplated in different embodiments, and the examples listed herein are not intended to be limiting.

Figure 5:
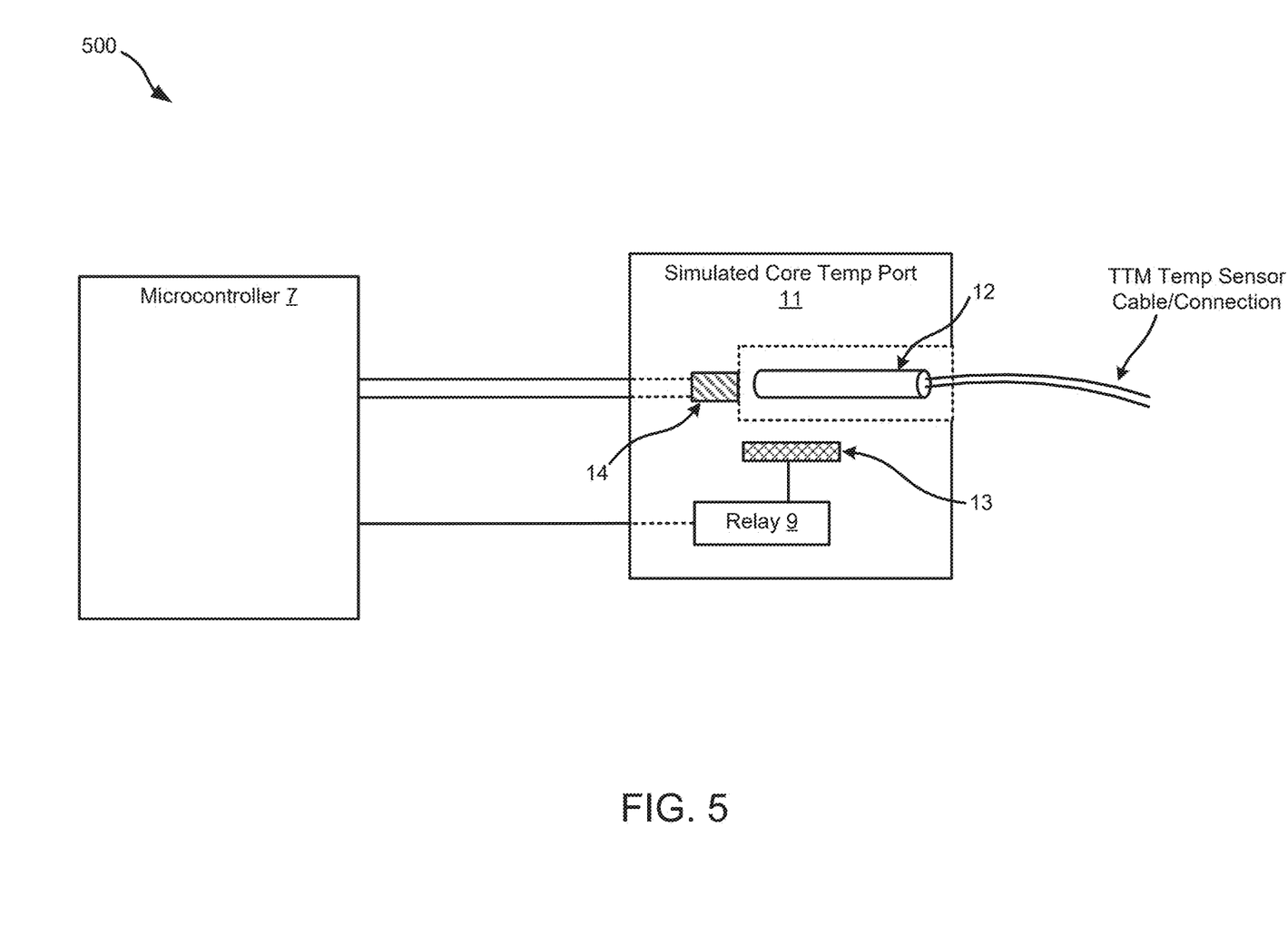
FIG. 5 illustrates a schematic diagram of a simulated core temperature port coupled at one end to a microcontroller or computer and at another end to a TTM temperature sensor, according to various aspects of the present disclosure.

FIG. 5 illustrates a schematic diagram 500 of a simulated core temperature port 11 coupled at one end to the control unit 7 and at another end to a TTM (e.g., via a TTM temperature sensor connection or cable), according to various aspects of the present disclosure.

In some embodiments, a simulated core temperature port 11 may be built into the PETS system (e.g., PETS system 300), where the simulated core temperature port 11 may be configured to receive a TTM device temperature sensor 12 from the TTM. In other words, the TTM device temperature sensor 12 of the TTM device may be directly placed in the core temperature port 11, in some embodiments. As seen, the TTM device temperature sensor 12 may be electrically coupled to the TTM device using a TTM temperature sensor connection or cable. Furthermore, the simulated core temperature port 11 may include a heating element 13 to maintain a temperature equal or substantially equal to the patient core temperature, where the patient core temperature may be calculated using the internal body thermodynamic simulation 8. In some examples, the core temperature port 11 may also include a temperature sensor 14, which can allow the control unit 7 to monitor and/or control the temperature in the simulated core temperature port 11. For example, the PETS system can include a third control feedback loop implemented using the heating element 13, control unit 7, relay, and the temperature sensor 14. In some cases, this third control feedback loop may be used to enable the control unit 7 to monitor and control the temperature in the simulated core temperature port 11.

Figure 6:
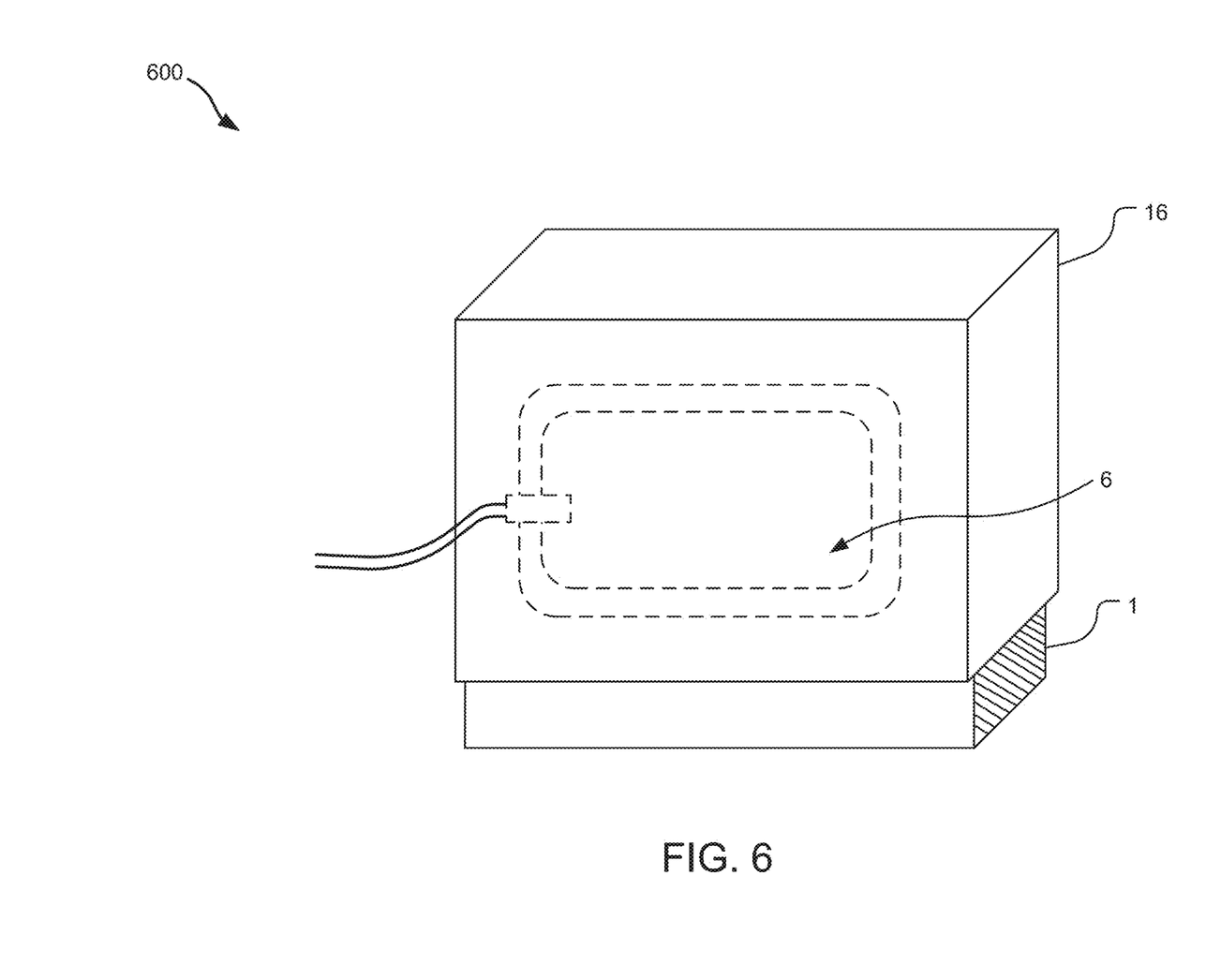
FIG. 6 illustrates an example showing one or more TTM pads, as well as a cover placed on the simulated skin layer, according to various aspects of the present disclosure.

FIG. 6 illustrates an example (600) showing one or more TTM pads 6, as well as a cover 16 placed on the simulated skin layer 1, according to various aspects of the present disclosure. In some examples, a cover 16 (e.g., fashioned from cloth, flexible plastic, or another applicable material) may be placed over the simulated skin layer 1, which can help in simulating clothing or sheets, shielding the simulated skin layer 1 from local air currents, or a combination thereof.

Figure 7:
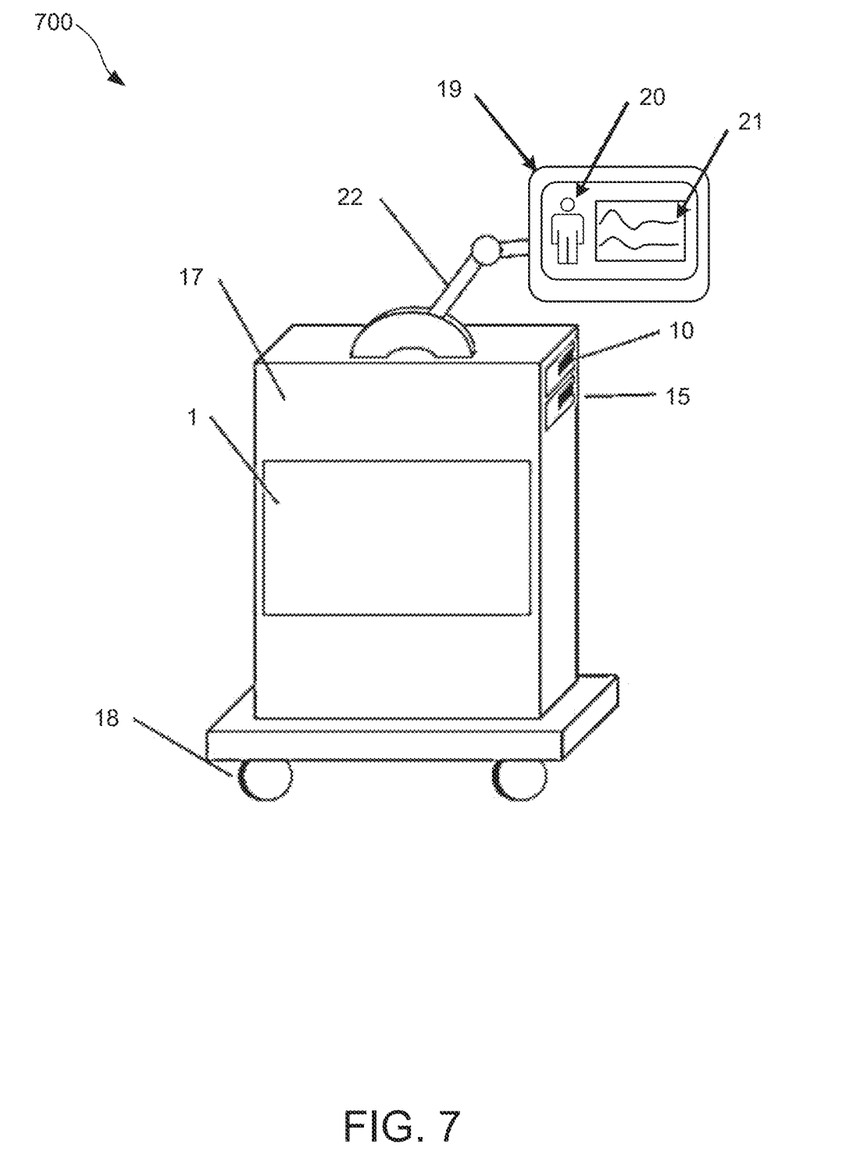
FIG. 7 illustrates an example of a Patient Electronic Thermodynamic Simulator (PETS) configured to be used in conjunction with a TTM system to allow users to test the functionality of the TTM equipment, according to various aspects of the disclosure.

Turning now to FIG. 7, which illustrates an example of a PETS 700, according to various aspects of the disclosure. As noted above, the PETS may be configured to be used in conjunction with TTM equipment to allow users to test the functionality of the TTM equipment. In some cases, the PETS 700 described with reference to FIG. 7 may implement one or more aspects of the PETS system 300 described above with reference to FIG. 3. As seen in FIG. 7, the PETS 700 comprises a simulated skin layer 1, an outer enclosure 17 (or housing 17), wheels 18 (optional), a screen 19 (e.g., a touch screen display), an articulated arm 22 (optional), a data port 15, and a port for the simulated core temperature sensor 10.

In some cases, the outer enclosure 17 may be designed such that at least a portion of the simulated skin layer 1 is exposed on the side (e.g., for placement of the TTM pads 6). Furthermore, the enclosure 17 can have optional wheels 18 which can facilitate easy movement of the PETS. In some embodiments, the PETS can include a screen 19 for displaying the simulated patient temperatures 20 and/or displaying data (e.g., charts, graphs, etc.) from the simulation and TTM instrument 21. In some examples, the screen 19 can be a touch screen. Additionally, or alternatively, the screen 19 may be integrated with one or more hardware buttons. In such cases, a user of the PETS may click or press on the one or more hardware buttons to interface or interact with the simulator. In some cases, the optional articulated arm 22 may allow a user to adjust the position of the screen for ease of use, ergonomics, etc. For instance, a user can raise or lower the position of the screen 19, swivel the screen 19, and/or rotate the screen 19 (e.g., from a horizontal orientation to a vertical orientation), to name a few non-limiting examples.

In some cases, the data port 15 may be configured to provide a connection between the TTM device and the control unit 7, in accordance with various aspects of the disclosure. In one non-limiting example, the data port 15 can directly connect to the TTM device, which can allow the control unit 7 to record serial data in real-time during a simulation, e.g., for side-by-side comparison with the simulator data.

Figure 8:
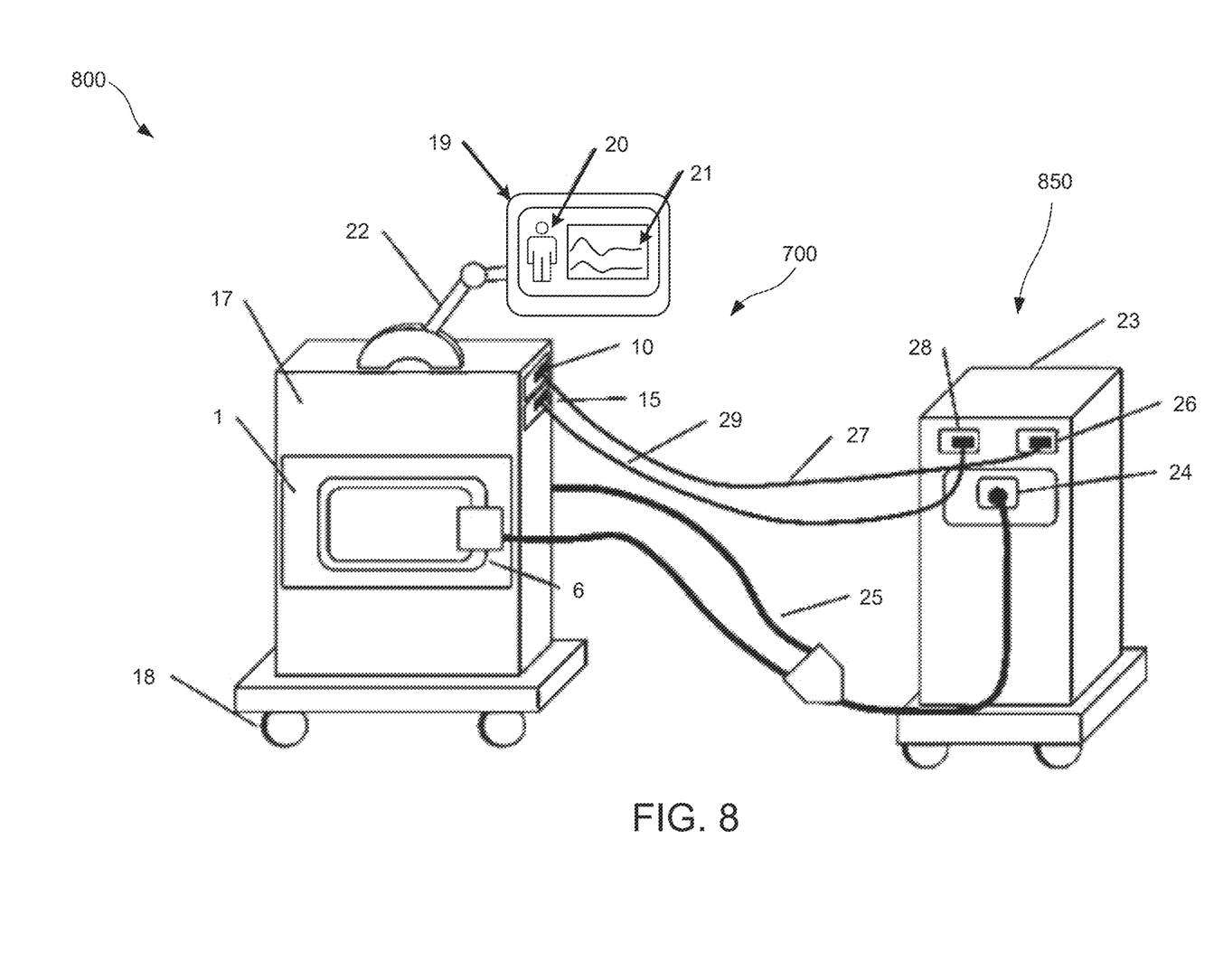
FIG. 8 illustrates an example of a system comprising a PETS, TTM equipment, and one or more connections to perform a simulation, according to various aspects of the disclosure.

FIG. 8 illustrates an example of a system 800 comprising the PETS 700, TTM equipment 850, and one or more connections to perform a simulation, according to various aspects of the disclosure. The PETS 700 may be similar or substantially similar to the PETS 700 and/or PETS system 300 described above with reference to FIGS. 3 and/or 7, respectively.

As seen, the TTM equipment 850 includes a TTM device 23 connected to the PETS 700 using one or more connections (e.g., cables, hoses, etc.). In this example, the one or more TTM pads 6 are attached to (or placed on) the simulated skin layer 1. Additionally, a plurality of water hoses 25 (or fluid hoses 25) are coupled to the TTM pads 6 and configured to carry water from the water port 24 of the TTM device 23 to the TTM pads 6, for instance, to cool or warm the simulated patient. For instance, the water hoses 25 may carry cool water (e.g., under 35 degrees C., under 32 degrees, etc.) to the TTM pads 6 to cool the temperature of the simulated patient (or simulated skin layer 1). Similarly, the water hoses 25 may carry warm water (e.g., above 38 degrees C.) to the TTM pads 6 to warm the temperature of the simulated patient.

In some embodiments, the TTM device 23 may include a patient temperature sensor port 26, where the temperature sensor port 16 is electrically and/or communicatively coupled to the simulated patient core temperature sensor 10 using a cable 27. In this example, the cable 27 is a two-conductor signal cable 27, but any other applicable cable, transmission line, etc., can be utilized in different embodiments. In some cases, the TTM device 23 also includes a data port 28, where the data port 28 of the TTM is electrically and/or communicatively coupled to the data port 15 of the PETS 700 using a cable 29 (e.g., USB cable, or another applicable digital cable).

Figure 9:
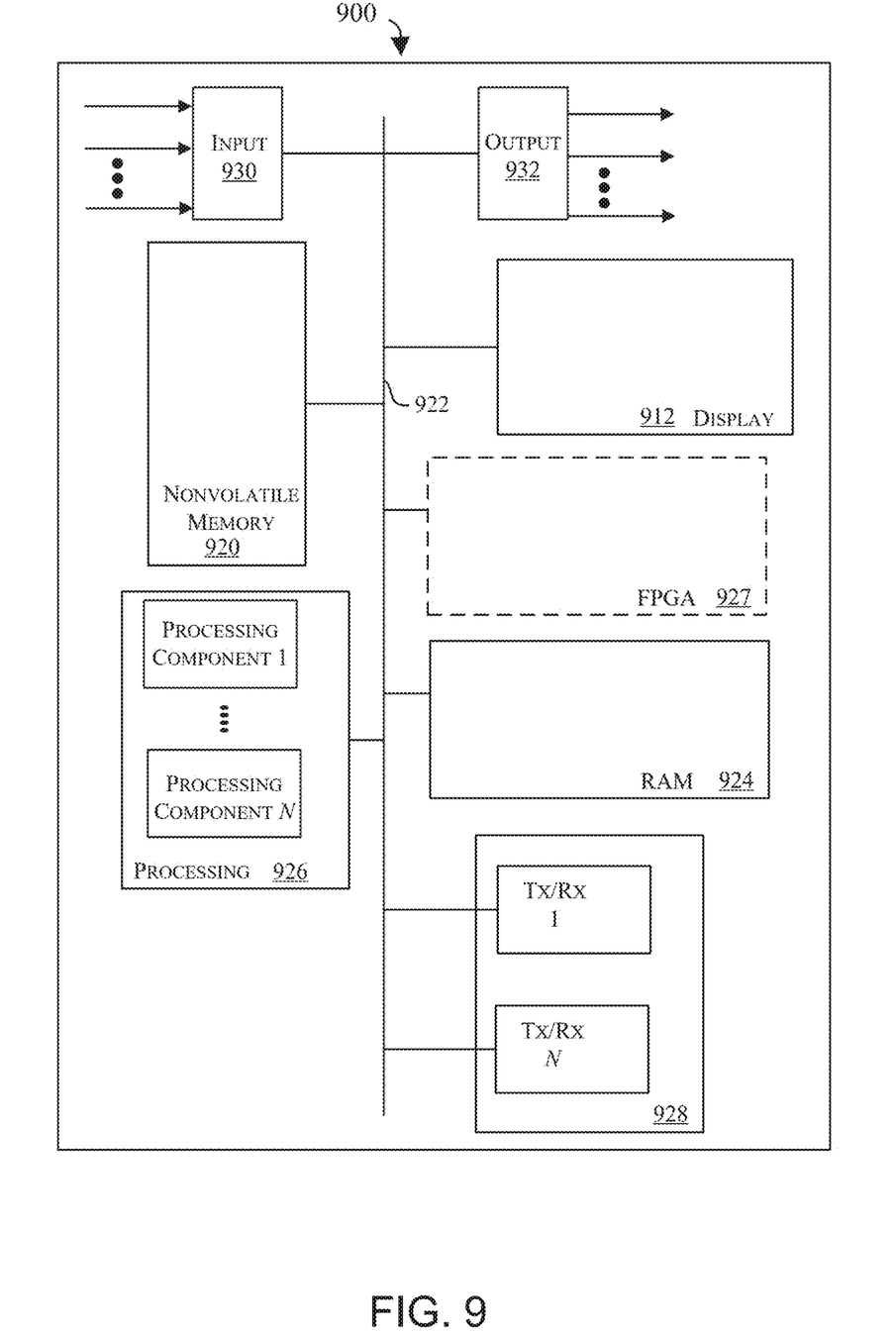
FIG. 9 illustrates a block diagram of a computer system that can be used to effectuate one or more aspects of the present disclosure.

The methods described in connection with the embodiments disclosed herein may be embodied directly in hardware, in processor-executable code encoded in a non-transitory tangible processor readable storage medium, or in a combination of the two. Referring to FIG. 9 for example, shown is a block diagram 900 depicting physical components that may be utilized to realize the control unit 7 (or microcontroller 7) according to an exemplary embodiment. As shown, in this embodiment a display portion 912 and nonvolatile memory 920 are coupled to a bus 922 that is also coupled to random access memory ("RAM") 924, a processing portion (which includes N processing components) 926, an optional field programmable gate array (FPGA) 927, and a transceiver component 928 that includes N transceivers. Although the components depicted in FIG. 9 represent physical components, FIG. 9 is not intended to be a detailed hardware diagram; thus, many of the components depicted in FIG. 9 may be realized by common constructs or distributed among additional physical components. Moreover, it is contemplated that other existing and yet-to-be developed physical components and architectures may be utilized to implement the functional components described with reference to FIG. 9.

This display portion 912 generally operates to provide a user interface for a user, and in several implementations, the display is realized by a touchscreen display (e.g., screen 19 in FIG. 7). In general, the nonvolatile memory 920 is non-transitory memory that functions to store (e.g., persistently store) data and processor-executable code (including executable code that is associated with effectuating the methods described herein). In some embodiments for example, the nonvolatile memory 920 includes bootloader code, operating system code, file system code, and non-transitory processor-executable code to facilitate the execution of any of the method(s) described herein.

In many implementations, the nonvolatile memory 920 is realized by flash memory (e.g., NAND or ONENAND memory), but it is contemplated that other memory types may be utilized as well. Although it may be possible to execute the code from the nonvolatile memory 920, the executable code in the nonvolatile memory is typically loaded into RAM 924 and executed by one or more of the N processing components in the processing portion 926.

The N processing components in connection with RAM 924 generally operate to execute the instructions stored in nonvolatile memory 920 to enable electronic patient thermodynamic simulation. For example, non-transitory, processor-executable code to effectuate the method(s) described with reference to FIGS. 1-8 may be persistently stored in nonvolatile memory 920 and executed by the N processing components in connection with RAM 924. As one of ordinarily skill in the art will appreciate, the processing portion 926 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 926 may be configured to effectuate one or more aspects of the methodologies described herein. For example, non-transitory processor-readable instructions may be stored in the nonvolatile memory 920 or in RAM 924 and when executed on the processing portion 926, cause the processing portion 926 to implement one or more aspects of any of the control feedback loops (e.g., first control feedback loop implemented using heaters 2, temp sensors 4, and control unit 7; second control feedback loop implemented using simulated core temperature sensor 10, control unit 7, heaters 2, simulation 8) described herein. Additionally, or alternatively, non-transitory FPGA-configuration-instructions may be persistently stored in nonvolatile memory 920 and accessed by the processing portion 926 (e.g., during boot up) to configure the hardware-configurable portions of the processing portion 926 to effectuate the functions of the control unit 7.

The input component 930 operates to receive signals (e.g., temperature readings from temp sensors, estimated or simulated core temperature from simulation 8). The output component 931 generally operates to provide one or more analog or digital signals, for instance, a signal to vary the resistance of the variable resistor 99, a signal to the heater and/or heater relay, to name two non-limiting examples. For example, the output portion 932 may provide the signal(s) described with reference to FIG. 3.

The depicted transceiver component 928 includes N transceiver chains, which may be used for communicating with external devices (e.g., TTM device or equipment) via wireless or wireline networks. Each of the N transceiver chains may represent a transceiver associated with a particular communication scheme (e.g., Wi-Fi, Ethernet, Profibus, etc.). In one non-limiting example, the transceiver component 928 may comprise the data port 15 described above.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A patient electronic thermodynamics simulator (PETS) system, comprising:
   a simulated skin layer for simulating a thermodynamic response of a patient's skin, wherein the simulated skin layer comprises:
      a mass of material, and
      a plurality of heating elements, wherein the plurality of heating elements are thermally connected to the mass of material;
   at least one temperature sensor disposed in the simulated skin layer;
   one or more targeted temperature management (TTM) pads applied to the simulated skin layer, wherein the one or more TTM pads are,
      coupled to a TTM device, and
      configured to modify heat transfer from the simulated skin layer;
   a control unit configured to:
      obtain temperature data from the at least one temperature sensor, adjust an amount of power supplied to one or more of the plurality of heating elements, based at least in part on the temperature data, and simulate, using an internal body thermodynamic simulation, a core body temperature for the patient, wherein simulating the core body temperature is based at least in part on the amount of power supplied to the one or more heating elements and the temperature data; and a simulated core temperature sensor configured to communicate information pertaining to the simulated core body temperature to the TTM device.

2. The PETS system of claim 1, further comprising:
a first control feedback loop implemented using the plurality of heating elements, the at least one temperature sensor, and the control unit; and
a second control feedback loop implemented using the plurality of heating elements, the simulated core temperature sensor, internal body thermodynamic simulation, and the control unit.

3. The PETS system of claim 1, wherein the control unit is further configured to:
update a temperature of the simulated skin layer, based on the first control feedback loop; and
update a resistance value of the simulated core temperature sensor, based on the second control feedback loop.

4. The PETS system of claim 1, wherein:
modifying the heat transfer from the simulated skin layer comprises transferring heat into or out of the simulated skin layer; and
when the one or more TTM pads modify the heat transfer from the simulated skin layer, the control unit is further configured to:
dynamically adjust the amount of power supplied to the one or more heating elements such that a temperature of the simulated skin layer mimics the thermodynamic response of the patient's skin.

5. The PETS system of claim 4, wherein dynamically adjusting the power supplied to the one or more heating elements comprises:
monitoring the temperature of the simulated skin layer using the at least one temperature sensor;
calculating a target temperature for the simulated skin layer; and
adjusting the power supplied to the one or more heating elements such that the temperature of the simulated skin layer reaches the target temperature.

6. The PETS system of claim 1, wherein the control unit is further configured to:
dynamically adjust a resistance value of the simulated core temperature sensor, based on the patient's simulated core body temperature; and
wherein the simulated core temperature sensor comprises at least one of a simulated thermistor, a digital potentiometer, a programmable resistor, a variable resistor, a variable resistor network, a temperature-dependent resistor, and a temperature-sensitive resistor.

7. The PETS system of claim 1, wherein the mass of material of the simulated skin layer comprises one or more of a metal, a plastic, a gel, an epoxy, and a polyurethane.

8. The PETS system of claim 1, wherein each of the plurality of heating elements is connected to the control unit using a lead and relay, and wherein adjusting the amount of power supplied to the one or more of the plurality of heating elements comprises controlling the one or more respective relays using the control unit to adjust or control a temperature of the respective heating element.

9. The PETS system of claim 1, wherein at least one of:
each of the plurality of heating elements disposed within the simulated skin layer comprises one of a resistive heater and a Peltier device; and
each of the at least one temperature sensor comprises one of a thermistor or a thermocouple.

10. The PETS system of claim 1, further comprising:
a data port for connecting the control unit to the TTM device, wherein the data port enables the control unit to record serial data in real-time during a simulation.

11. The PETS system of claim 1, further comprising a screen for displaying at least one of:
the simulated core body temperature,
temperature data obtained from the at least one temperature sensor disposed in the simulated skin layer;
data associated with the internal body thermodynamic simulation; and
data associated with the TTM device.

12. The PETS system of claim 1, wherein the modifying the heat transfer to the simulated skin layer using the one or more TTM pads comprises adjusting a temperature of a fluid flowing to the TTM pads, based on a therapy requirement.

13. The PETS system of claim 12, wherein the fluid comprises water, and wherein the therapy requirement comprises a cooling therapy or a heating therapy.

14. The PETS system of claim 13, wherein the TTM device is configured to:
detect a change in a resistance value of a variable resistor of the simulated core temperature sensor;
calculate the simulated core body temperature for the patient, based on the information received from the simulated core temperature sensor and a lookup table of resistance and temperatures; and
adjust a temperature of the water flowing to the TTM pads.

15. A method for operating a patient electronic thermodynamic simulator (PETS) system, the method comprising:
providing a simulated skin layer for simulating a thermodynamic response of a patient's skin, wherein the simulated skin layer comprises:
a mass of material, and
a plurality of heating elements, wherein the plurality of heating elements are thermally connected to the mass of material;
disposing at least one temperature sensor in the simulated skin layer;
applying one or more targeted temperature management (TTM) pads to the skin layer for modifying heat transfer from the simulated skin layer, wherein the one or more TTM pads are coupled to a TTM device;
obtaining temperature data from the at least one temperature sensor;
adjusting an amount of power supplied to one or more of the plurality of heating elements, based at least in part on the temperature data;
simulating, using an internal body thermodynamic simulation, a core body temperature for the patient, wherein simulating the core body temperature is based at least in part on the amount of power supplied to the one or more heating elements and the temperature data; and
transmitting information pertaining to the simulated core body temperature to the TTM device using a simulated core temperature sensor.

16. The method of claim 15, wherein the PETS system further comprises:
  a first control feedback loop implemented using the plurality of heating elements, the at least one temperature sensor, and the control unit; and
  a second control feedback loop implemented using the plurality of heating elements, the simulated core temperature sensor, internal body thermodynamic simulation, and the control unit; and
  wherein the method further comprises:
    updating a temperature of the simulated skin layer, based on the first control feedback loop; and
    updating a resistance value of the simulated core temperature sensor, based on the second control feedback loop.

17. The method of claim 15, wherein:
  modifying the heat transfer from the simulated skin layer comprises transferring heat into or out of the simulated skin layer; and
  when the one or more TTM pads modify the heat transfer from the simulated skin layer, the method further comprises:
    dynamically adjusting the amount of power supplied to the one or more heating elements such that a temperature of the simulated skin layer mimics the thermodynamic response of the patient's skin.

18. The method of claim 17, wherein dynamically adjusting the power supplied to the one or more heating elements comprises:
  monitoring the temperature of the simulated skin layer using the at least one temperature sensor;
  calculating a target temperature for the simulated skin layer; and
  adjusting the power supplied to the one or more heating elements such that the temperature of the simulated skin layer reaches the target temperature.

19. The method of claim 15, wherein the modifying the heat transfer to the simulated skin layer using the one or more TTM pads comprises adjusting a temperature of a fluid flowing to the TTM pads, based on a therapy requirement; and the method further comprises:
  detecting a change in a resistance value of a variable resistor of the simulated core temperature sensor;
  calculating the simulated core body temperature for the patient, based on the information received from the simulated core temperature sensor and a lookup table of resistance and temperatures; and
  adjusting a temperature of the fluid flowing to the TTM pads.

20. A non-transient computer-readable storage medium having instructions embodied thereon, the instructions being executable by one or more processors to perform a method for operating a patient electronic thermodynamic simulator (PETS) system, the method comprising:
  providing a simulated skin layer for simulating a thermodynamic response of a patient's skin, wherein the simulated skin layer comprises:
    a mass of material, and
    a plurality of heating elements thermally connected to the mass of material;
  disposing at least one temperature sensor in the simulated skin layer;
  applying one or more targeted temperature management (TTM) pads to the skin layer for modifying heat transfer from the simulated skin layer, wherein the one or more TTM pads are coupled to a TTM device;
  obtaining temperature data from the at least one temperature sensor;
  adjusting an amount of power supplied to one or more of the plurality of heating elements, based at least in part on the temperature data;
  simulating, using an internal body thermodynamic simulation, a core body temperature for the patient, wherein simulating the core body temperature is based at least in part on the amount of power supplied to the one or more heating elements and the temperature data; and
  transmitting information pertaining to the simulated core body temperature to the targeted temperature management (TTM) device using a simulated core temperature sensor.

* * * * *